(12) United States Patent
Odagawa et al.

(10) Patent No.: US 8,722,430 B2
(45) Date of Patent: *May 13, 2014

(54) PRODUCTION METHOD FOR OXIDIZED CARBON THIN FILM, AND ELEMENT HAVING OXIDIZED CARBON THIN FILM AND PRODUCTION METHOD THEREFOR

(71) Applicant: Panasonic Corporation, Kadoma (JP)

(72) Inventors: Akihiro Odagawa, Osaka (JP); Nozomu Matsukawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/627,465

(22) Filed: Sep. 26, 2012

(65) Prior Publication Data

US 2013/0023070 A1 Jan. 24, 2013

Related U.S. Application Data

(63) Continuation of application No. PCT/JP2011/006464, filed on Nov. 21, 2011.

(30) Foreign Application Priority Data

Nov. 22, 2010 (JP) ................................ 2010-259741

(51) Int. Cl.
*H01L 21/326* (2006.01)
*H01L 21/66* (2006.01)

(52) U.S. Cl.
USPC ............................................................. 438/3

(58) Field of Classification Search
USPC ......... 438/17, 466, 3; 257/E21.327, E21.531, 257/17, 466, 3
See application file for complete search history.

(56) References Cited

U.S. PATENT DOCUMENTS 7,781,230 B2 * 8/2010 Odagawa et al. ................. 438/3
8,502,332 B2 8/2013 Sasaki et al.
(Continued)

FOREIGN PATENT DOCUMENTS

JP 2000-247740 9/2000
JP 2003-231097 8/2003
(Continued)

OTHER PUBLICATIONS

Masubuchi, et al., "Fabrication of graphene nanoribbon by local anodic oxidation lithography using atomic force microscope", Applied Physics Letters, vol. 94, pp. 082107-1-082107-3, 2009.

(Continued)

*Primary Examiner* — Savitr Mulpuri
(74) *Attorney, Agent, or Firm* — Hamre, Schumann, Mueller & Larson, P.C.

(57) ABSTRACT

The production method for the oxidized carbon thin film of the present disclosure includes: a first step of preparing a carbon thin film and iron oxide that is in contact with the carbon thin film and contains $Fe_2O_3$; and a second step of forming an oxidized carbon thin film having an oxidized portion composed of oxidized carbon by applying a voltage or current between the carbon thin film and the iron oxide with the carbon thin film side being positive and thereby oxidizing a contact portion of the carbon thin film with the iron oxide to change it into the oxidized portion. This production method allows a pattern of nanometer order to be formed on a carbon thin film represented by graphene. The method causes less damage to the formed pattern and has high affinity with a semiconductor process, thereby enabling a wide range of applications as a process technique for producing an electronic device.

7 Claims, 13 Drawing Sheets

(56) References Cited

U.S. PATENT DOCUMENTS

| | | | |
|---|---|---|---|
| 2003/0186059 A1* | 10/2003 | Hirata et al. | 428/408 |
| 2004/0052006 A1* | 3/2004 | Odagawa et al. | 360/324.1 |
| 2004/0080876 A1* | 4/2004 | Sugita et al. | 360/324.2 |
| 2004/0130431 A1* | 7/2004 | Matsukawa et al. | 338/32 R |
| 2010/0092865 A1* | 4/2010 | Kanno et al. | 429/221 |
| 2010/0200839 A1* | 8/2010 | Okai et al. | 257/29 |
| 2011/0183438 A1 | 7/2011 | Matsumoto et al. | |
| 2012/0276455 A1* | 11/2012 | Nishimura et al. | 429/232 |
| 2013/0217151 A1* | 8/2013 | Odagawa et al. | 438/3 |

FOREIGN PATENT DOCUMENTS

| | | |
|---|---|---|
| JP | 2009-182173 | 8/2009 |
| JP | 2010-153793 | 7/2010 |

OTHER PUBLICATIONS

Novoselov, et al., "Electric Field Effect in Atomically Thin Carbon Films", Science, vol. 306, pp. 666-669, 2004.

Jin, et al., "Graphene oxide thin film field effect transistors without reduction", Journal of Physics D Applied Physics, vo. 42, No. 13, p. 135109, 1-5, 2009.

Machida, "Fabrication of Graphene Quantum Dots Using Scanning Probe Microscope Lithography", The Murata Science Foundation, Annual Report, No. 24, pp. 434-439, 2010.

Li, et al., "Chemically Derived, Ultrasmooth Graphene Nanoribbon Semiconductors", Science, vol. 319, pp. 1229-1232, 2008.

Ejiri, et al., "Fabrication and application for spin injection with Magnetite/InAs heterostructure", IEICE Technical Report, vol. 108, No. 438, pp. 13-17, 2009 with an English Abstract.

Shiraishi, et al., "Robustness of Spin Polarization in Graphene-Based Spin Values", Advanced Functional Materials, vol. 19, pp. 3711-3716, 209.

Koki Takanashi, Oyo Buturi, vol. 77, pp. 255-263, 2008 with a partial English translation.

Masashi Shiraishi, "Graphene Spintronics", Journal of the Surface Science Society of Japan, vol. 31, pp. 162-168, 2010 with an English Abstract.

Tombros, et al., "Electronic spin transport and spin precession in single grapheme layers at room temperature", Nature, vol. 448, pp. 571-575, 2007.

Wang, et al., "Magnetotransport properties of mesoscopic graphite spin valves", Physical review B, vol. 77, 020402(R), 2008.

Yanase, et al., Electronic Structure in Hight Temperature Phase of $Fe_3O_4$, Journal of the Physical Society of Japan, vol. 68, pp. 1607-1613, 1999.

Shiraishi, et al., "Robustness of Spin Polarization in Graphene-Based Spin Values", Advanced Functional Materials, vol. 19, pp. 3711-3716, 2009.

* cited by examiner

Number of times of application of electrical pulse

Number of times of application of electrical pulse

PRODUCTION METHOD FOR OXIDIZED CARBON THIN FILM, AND ELEMENT HAVING OXIDIZED CARBON THIN FILM AND PRODUCTION METHOD THEREFOR

This application is a Continuation of PCT/JP2011/006464 filed on Nov. 21, 2011, which claims foreign priority of Japanese Patent Application No. 2010-259741 filed on Nov. 22, 2010, the entire contents of both of which are incorporated herein by reference.

BACKGROUND OF THE INVENTION

1. Field of the Invention

The present disclosure relates to a production method for an oxidized carbon thin film that is a carbon thin film having an oxidized portion composed of oxidized carbon. The present disclosure relates also to an element having the oxidized carbon thin film and a production method for the element.

2. Description of Related Art

A substance composed of carbon (C) has a wide variety of structures ranging from a sheet, a nanotube, and a horn to a ball such as C60 fullerene, as well as diamond. Further, the physical properties thereof provides a rich variety as much as or more than its forms. Such a rich variety of properties promotes diligent research and development relating to applications of the substance. Carbon thin films can be mentioned as one of such substances composed of carbon. Among them, the carbon thin film composed of one or several carbon atom layers in which carbon atoms are bonded via $sp^2$ bond is called graphene. Graphene is a substance whose isolation was achieved in 2004, and its peculiar properties as a two dimensional semimetal are now being revealed (Science, vol. 306, pp. 666-669 (2004)). Graphene has a peculiar band structure in which $\pi$ bands having a linear band dispersion intersect at the Fermi energy. Therefore, graphene is expected to have high carrier (electron and hole) mobility that is at least 10 times that of silicon (Si). The use of graphene may allow high-speed and low-consumption electronic devices to be achieved.

In the case of using graphene for electronic devices (for example, field-effect elements such as a transistor), it may be necessary to suppress the extremely high electrical conductivity of graphene. JP 2009-182173 A and Science, vol. 319, pp. 1229-1232 (2008) disclose that when the width of graphene in the direction perpendicular to the moving direction of the carrier is set to several nanometers to several tens of nanometers, one-dimensional quantum confinement effect is exerted in graphene in the section having such a width, and that, on the basis of this effect, graphene in this section can be used as a semiconductor having an energy gap of about sub-eV to several eV.

JP 2009-182173 A and Science, vol. 306, pp. 666-669 (2004) disclose methods for patterning graphene into fine patterns by electron beam lithography and dry etching using oxygen plasma.

Science, vol. 319, pp. 1229-1232 (2008) discloses a method for fine fabrication of graphene using ultrasound.

Applied Physics Letters, vol. 94, 082107 (2009) discloses the fine fabrication of graphene by anode oxidation using the needle of an atomic force microscope (AFM).

SUMMARY OF THE INVENTION

One non-limiting and exemplary embodiment provides a method that allows a pattern of nanometer order to be formed on a carbon thin film represented by graphene. The method causes less damage to the formed pattern and has high affinity with a semiconductor process, and can be applied in a wide range as a process technique for producing an electronic device.

The present disclosure provides a production method for the oxidized carbon thin film including: a first step of preparing a carbon thin film, and iron oxide that is in contact with the carbon thin film and contains $Fe_2O_3$; and a second step of forming an oxidized carbon thin film having an oxidized portion composed of oxidized carbon by applying a voltage or current between the carbon thin film and the iron oxide with the carbon thin film side being positive and thereby oxidizing a contact portion of the carbon thin film with the iron oxide to change it into the oxidized portion.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

DETAILED DESCRIPTION

Figure 1:
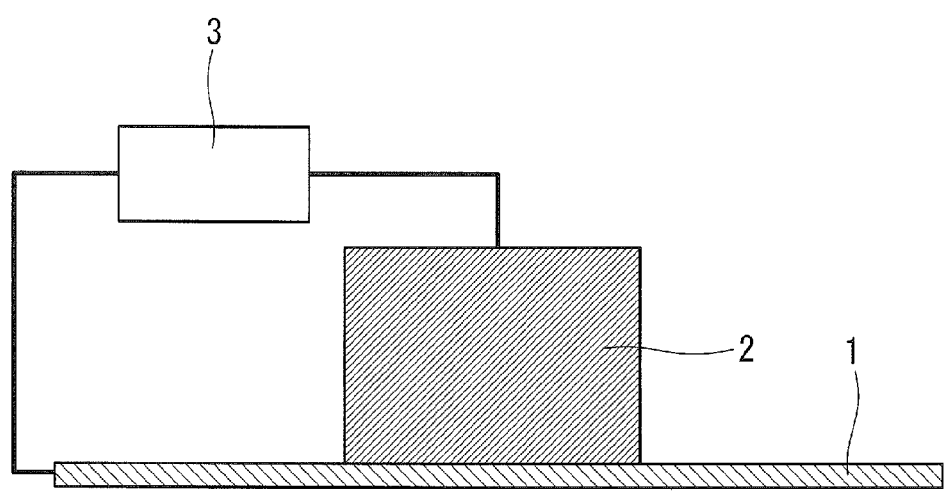
FIG. 1 is a schematic diagram showing an example of a configuration including a carbon thin film and iron oxide for performing the production method for the oxidized carbon thin film of the present disclosure.

Graphenes are in the form of a sheet with an atomic-level thickness, and thus its processing into a fine width as disclosed in JP 2009-182173 A and Science, vol. 319, pp. 1229-1232 (2008) is not easy. Science, vol. 306, pp. 666-669 (2004) discloses only fine fabrication in a size of several hundred nanometers.

Although JP 2009-182173 A discloses fine fabrication in a size of several nanometers, this fine fabrication involves a wet step, such as application and removal of resist, and a drying step, such as plasma treatment, that causes significant damage to the thin film in combination. Therefore, it is difficult to stably perform the fine fabrication of graphene of nanometer order, where the edges of the formed pattern are expected to significantly affect the device properties. In addition to this, the fine fabrication disclosed in JP 2009-182173 A costs much, including that the apparatus for achieving such fabrication is expensive.

It is difficult for the method disclosed in Science, vol. 319, pp. 1229-1232 (2008) to subject the target point of graphene to the fine fabrication. This method is difficult to apply as a process technique.

The method disclosed in Applied Physics Letters, vol. 94, 082107 (2009) shows low performance (throughput). In addition, this method requires an atmosphere in the presence of water to perform graphene processing. Therefore, this method has low affinity with a semiconductor process, and is difficult to apply as a process technique.

As a result of diligent studies, the inventors found that the method, which can be applied in a wide range as a process technique for producing an electronic device, that allows a pattern of nanometer order to be formed on a carbon thin film represented by graphene, causes less damage to the formed pattern, and has high affinity with a semiconductor process can be achieved by forming an oxidized portion composed of oxidized carbon in a carbon thin film through application of an electrical bias to the carbon thin film via iron oxide, not by employing fine fabrication in which only a part of the carbon thin film is left while the other part is removed by subjecting the carbon thin film to plasma treatment, etc. In this description, a carbon thin film in which an oxidized portion composed of oxidized carbon is entirely or partially formed is simply referred to as "oxidized carbon thin film". In other words, the oxidized carbon thin film in this description is not necessarily composed only of oxidized carbon, and may have a portion composed of carbon.

The present disclosure provides a production method for an element having an oxidized carbon thin film. The element includes: a substrate; and an oxidized carbon thin film that is disposed on the substrate and has an oxidized portion composed of oxidized carbon. The production method includes: a first step of preparing the substrate, the carbon thin film disposed on the substrate, and iron oxide containing $Fe_2O_3$, such that the iron oxide is in contact with the carbon thin film at a position to form the oxidized portion in the carbon thin film; and a second step of forming an oxidized carbon thin film having an oxidized portion composed of oxidized carbon by applying a voltage or current between the carbon thin film and the iron oxide with the carbon thin film side being positive and thereby oxidizing a contact portion of the carbon thin film with the iron oxide to change it into the oxidized portion.

The present disclosure provides an element having an oxidized carbon thin film. The element includes a substrate composed of a conductor or semiconductor, an oxidized carbon thin film disposed on the substrate, and an insulating layer disposed between the substrate and the oxidized carbon thin film. The oxidized carbon thin film has insulating portions composed of oxidized carbon and an non-insulating portion composed of carbon. The non-insulating portion has a narrow portion arranged between the insulating portions as seen from the direction perpendicular to the main plane of the oxidized carbon thin film. The element is an element in which the electrical conductivity of the non-insulating portion via the narrow portion in the in-plane direction of the oxidized carbon thin film is varied by application of an electric field between the substrate and the oxidized carbon thin film.

In the production method for the oxidized carbon thin film of the present disclosure, an oxidized portion composed of oxidized carbon is formed in a carbon thin film by application of an electrical bias via iron oxide, so that the thin film is changed into an oxidized carbon thin film. In the oxidized carbon thin film, the properties, typically the electrical conductivity, are different between in the oxidized portion and in the other portion (the portion composed of carbon). While the oxidized portion is insulating, the other portion exhibits electrical conductivity or properties as a semiconductor depending on its shape and size. The iron oxide can be formed in a pattern of nanometer order on the carbon thin film using a thin film forming technique. That is, the production method for the oxidized carbon thin film of the present disclosure allows a pattern of nanometer order on the basis of their properties to be formed on the carbon thin films represented by graphene. In addition to this, it is not necessary to remove a part of the thin film for pattern formation using a technique that causes significant damage to the carbon thin film, such as plasma treatment. Thus, damage to the formed pattern is reduced. Further, the production method for the oxidized carbon thin film of the present disclosure has high affinity with a semiconductor process, and can be widely used for applications as a process technique for producing an electronic device.

One example of the applications is the production method for the element having the oxidized carbon thin film of the present disclosure. One example of products to be obtained by such application is the element having the oxidized carbon thin film of the present disclosure.

Hereinafter, specific embodiments are described. The present invention is not limited to the following specific embodiments and examples.

Figure 2:
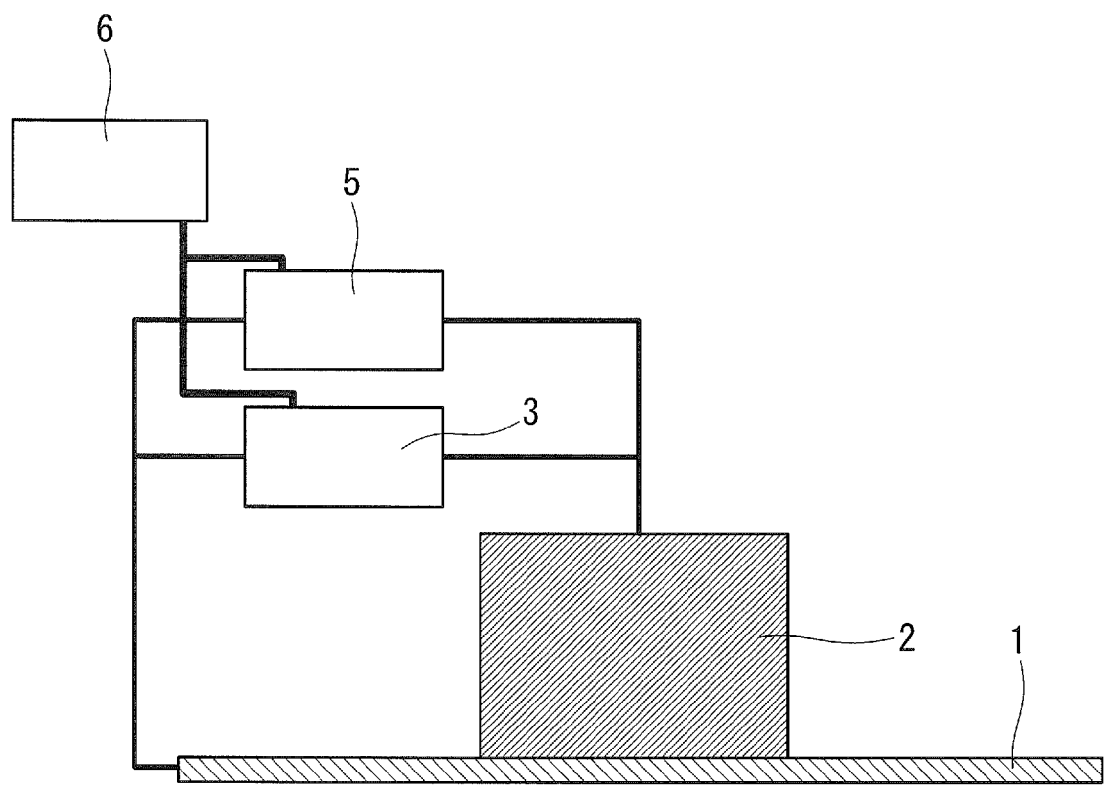
FIG. 2 is a schematic diagram showing another example of a configuration including a carbon thin film and iron oxide for performing the production method for the oxidized carbon thin film of the present disclosure.
Figure 3:
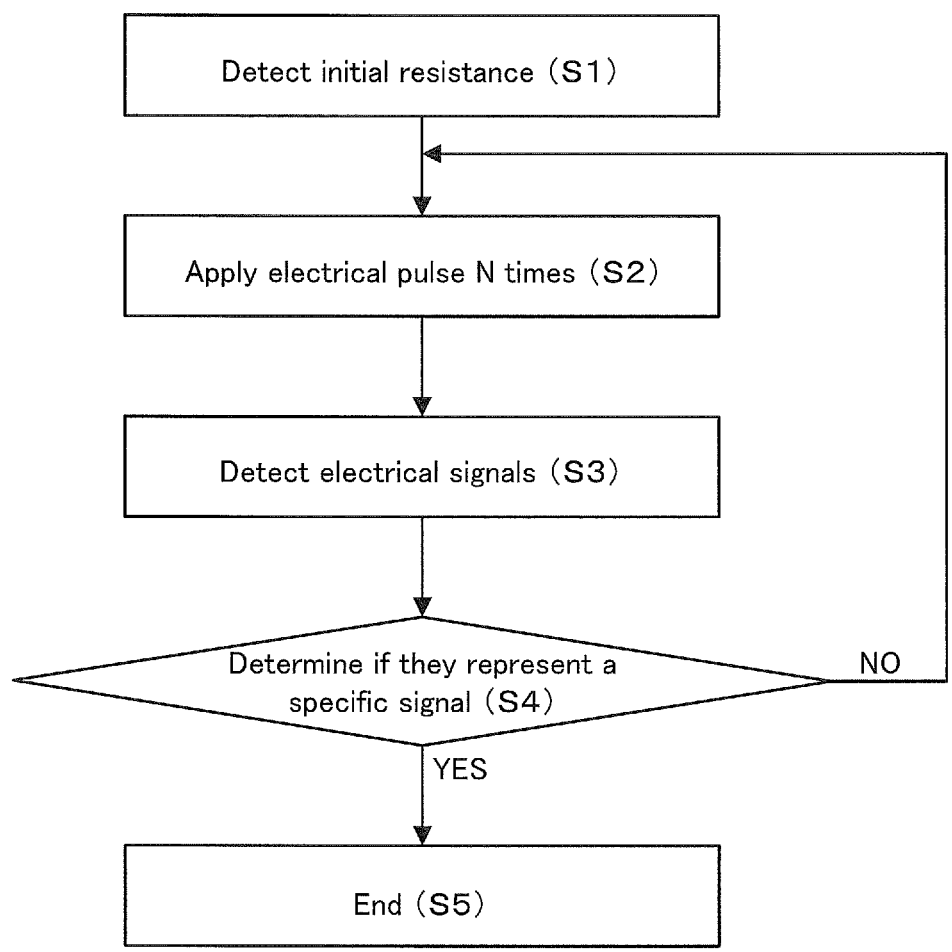
FIG. 3 shows an example of a flow chart for performing the production method for the oxidized carbon thin film of the present disclosure using the configuration shown in FIG. 2.

The production method for the oxidized carbon thin film of the present disclosure can be performed, for example, by an embodiment shown in FIG. 1 or FIG. 2 in accordance with the flow chart shown in FIG. 3.

As shown in FIG. 1, a carbon thin film 1 and iron oxide 2 disposed on the carbon thin film so as to be in contact with the carbon thin film 1 are first prepared (first step). To the carbon thin film 1 and the iron oxide 2, a bias applying unit 3 is electrically connected. The carbon thin film 1, the iron oxide 2, and the bias applying unit 3 form an electrical circuit. Next, an electrical bias (bias voltage or bias current) with the carbon thin film side being positive is applied between the carbon thin film 1 and the iron oxide 2 by the bias applying unit 3 (second step).

The carbon thin film 1 is a thin film having a $sp^2$-bonded carbon atom layer (hereinafter, referred to as a carbon atom layer). The carbon atom layer is composed of two dimensional network of carbon atoms. Each of the carbon atoms forming the carbon atom layer has four electrons. Among the four electrons, three electrons form a σ (Sigma) bond, and the last one forms a weak π (Pai) bond shared by the carbon atoms. Therefore, the carbon thin film having such a carbon atom layer has high electrical conductivity. However, a part of the sp$^2$ bond in the carbon atom layer is converted into an sp$^3$ bond by oxidation. In the sp$^3$ bond, all the four electrons form the σ bond. Therefore, the band on the Fermi surface formed by the π bond disappears in the oxidized portion of the carbon thin film 1 which has been formed by oxidation, so that the oxidized portion becomes an insulating portion.

The production method for the oxidized carbon thin film of the present disclosure utilizes such formation of the insulating portion by oxidation. More specifically, a contact portion of the carbon thin film 1 with the iron oxide 2 is oxidized by depositing the iron oxide 2 on the carbon thin film 1 and applying an electric field between the iron oxide 2 and the carbon thin film 1. The production method for the oxidized carbon thin film of the present disclosure can omit a step that causes significant damage to the carbon thin film, such as plasma treatment, and thus damage to the pattern formed on the resultant oxidized carbon thin film (that is, oxidized carbon/carbon pattern; when focusing on the properties, for example, insulating/non-insulating pattern) is reduced. This contributes to improvement in the properties of electronic devices. In addition to this, the production method for the oxidized carbon thin film of the present disclosure has high affinity with general processes such as a semiconductor process. Further, the iron oxide 2 can be deposited with high degree of freedom in the shape and size, ranging from fine patterns of nanometer order to larger patterns, for example, of millimeter order. Therefore, the production method for the oxidized carbon thin film of the present disclosure allows patterning of the oxidized carbon thin film with high degree of freedom in the shape and size. Of course, it is also possible to form an oxidized carbon thin film composed of oxidized carbon by depositing the iron oxide 2 on the entire surface of the carbon thin film 1 so that the carbon thin film 1 is oxidized entirely.

The production method for the oxidized carbon thin film of the present disclosure allows a carbon thin film patterned with an oxidized portion to be formed. The patterning may be performed either partially or fully in the plane direction of the carbon thin film 1, or may be performed either partially or fully in the thickness direction of the carbon thin film 1. However, in the case of oxidizing only a part in the thickness direction, the contact portion of the carbon thin film with the iron oxide may fail to be an insulating portion, depending on the degree of the oxidation. In the case where formation of an insulating portion without failure is intended, such as the case where the formed oxidized carbon thin film is used as a field-effect element, the production method of the present disclosure is desirably performed so that the whole in the thickness direction should be an oxidized portion. The patterning in the plane direction, for example, can be controlled by adjusting the shape and size of the iron oxide 2 to be deposited on the carbon thin film 1. The patterning in the thickness direction, for example, can be controlled by adjusting the intensity of the voltage or current (application time and amount of the voltage or current) to be applied between the carbon thin film 1 and the iron oxide 2.

The carbon thin film 1 is a thin film having a carbon atom layer. The carbon thin film 1, for example, is graphene. Graphene is a single-layer or multilayer graphene composed of one or several carbon atom layers. That is, the carbon thin film 1 may be a single-layer or multilayer graphene. Graphene 1 can be obtained, for example, by exfoliating a part of single crystal graphite or Highly Oriented Pyrolytic Graphite (HOPG).

The iron oxide 2 contains $Fe_2O_3$. The iron oxide 2 may be composed of $Fe_2O_3$. The iron oxide 2 may be a mixture of $Fe_2O_3$ and $Fe_3O_4$ partially containing $Fe_3O_4$. In this case, the carbon thin film can be oxidized more smoothly by application of an electrical bias. Further, $Fe_3O_4$ has lower resistance than $Fe_2O_3$, and thus the power to be applied can be adjusted more easily by adjusting the voltage when the iron oxide 2 contains $Fe_3O_4$. That is, the iron oxide further containing $Fe_3O_4$ may be prepared in the first step.

The shape of the iron oxide 2 is not limited as long as an oxidized carbon thin film having an oxidized portion composed of oxidized carbon can be formed by applying an electrical bias between the carbon thin film 1 and the iron oxide 2 with the carbon thin film 1 side being positive and thereby oxidizing a contact portion of the carbon thin film 1 with the iron oxide 2 to change it into the oxidized portion. The iron oxide 2, for example, is in the form of a bulk, a sheet, a layer, or particles.

The configuration of the bias applying unit 3 is not limited as long as it can apply an electrical bias between the carbon thin film 1 and the iron oxide 2. The same applies to the electrical connections of the bias applying unit 3 to the carbon thin film 1 and the iron oxide 2. The bias applying unit 3, for example, can be constructed using a pulse generator, a battery, and a voltage source with constant voltage application.

The electrical bias to be applied between the carbon thin film 1 and the iron oxide 2 is desirably in the form of a pulse (electrical pulse). That is, a voltage or current in the form of a pulse is desirably applied between the carbon thin film 1 and the iron oxide 2 in the second step. At this time, the voltage or current in the form of a pulse is desirably applied one or more times.

The value of the voltage or current to be applied between the carbon thin film 1 and the iron oxide 2 varies depending on their configurations, but for example, is 0.05 V to 100 V in terms of voltage. It is also possible to vary, for example, to gradually increase the voltage or current to be applied, while monitoring the progress of formation of the oxidized portion in the carbon thin film 1. A typical range of the voltage to be applied in which an oxidized portion is expected to be formed is 0.1 V to 20 V. When the voltage or current to be applied is excessively increased, insulation breakdown tends to occur in the oxidized portion even if such a portion is once formed. The pulse width when applying the voltage and current in the form of a pulse, for example, is 100 ns to 500 μs.

When applying the voltage or current in the form of a pulse, the number N of application of pulses can be adjusted corresponding to the intensity and the pulse width of the electrical bias to be applied. When the number N is small (when the oxidized portion is formed by a reduced number), the steps for performing the present disclosure production method is simplified. When the number N is large, the rate of oxidation by application of an electrical bias is reduced, and mechanical deterioration such as breakdown of the iron oxide 2 is suppressed. The oxidized portion can be formed stepwise by applying the voltage or current in the form of a pulse. The shape of the pulse may be rectangular, or may be in the form of a sine curve.

The voltage or current to be applied may be a constant electrical bias (for example, direct current bias). In this case, the protocol for applying the electrical bias and the configuration of the bias applying unit 3 are simplified.

The application of the electrical bias to the carbon thin film 1 and the iron oxide 2 is desirably continued until an oxidized portion is formed in a contact portion of the carbon thin film 1 with the iron oxide 2 and a specific value of electrical resistance appears in that portion (the oxidized portion). For achieving this, the configuration shown in FIG. 2, for example, can be employed. In the case where the contact portion of the carbon thin film 1 with the iron oxide 2 has a value of electrical resistance that suddenly increases after a lapse of time from the application of an electrical bias and thereafter becomes almost constant upon the completion of the formation of the oxidized portion, the specific value of electrical resistance, for example, can be this constant value. When direct detection of the electrical resistance in that portion is difficult, it is also possible to determine whether or not the specific value of electrical resistance has appeared in that portion, for example, by detecting the electrical resistance of an electrical circuit that includes such portion.

The configuration shown in FIG. 2 further includes a signal detecting unit 5 and a determination unit 6 in addition to the configuration shown in FIG. 1. The signal detecting unit 5 and the determination unit 6 detect signals flowing through the electrical circuit composed of the carbon thin film 1, the iron oxide 2, and the bias applying unit 3. The signal detecting unit 5 and the determination unit 6 themselves may be included in the electrical circuit. The signal detecting unit 5 is electrically connected to the carbon thin film 1 and the iron oxide 2, and detects electrical signals including information on the electrical resistance in the contact portion of the carbon thin film 1 with the iron oxide 2. The information on the electrical resistance, for example, is information on the electrical resistance as it is and/or information on the amount of change in the electrical resistance. The configuration of the signal detecting unit 5 is not limited as long as it can detect the above-mentioned electrical signals including the information on the electrical resistance, and the signal detecting unit 5 can be constructed using an ammeter, a voltmeter, a source meter, etc. For the signal detecting unit 5, a semiconductor parameter analyzer is desirably used. The determination unit 6 is connected to the bias applying unit 3 and the signal detecting unit 5. The determination unit 6 can be constructed using an information processing apparatus such as a personal computer (PC). According to the configuration shown in FIG. 2, it is possible to form an oxidized carbon thin film while detecting the electrical resistance in the contact portion of the carbon thin film 1 with the iron oxide 2 and/or the change thereof.

FIG. 3 shows an example of a flow chart for producing, with the configuration shown in FIG. 2, an oxidized carbon thin film having an oxidized portion that exhibits a specific value of electrical resistance.

First, the electrical resistance in the circuit composed of the carbon thin film 1, the iron oxide 2, and the bias applying unit 3 before an electrical bias is applied is detected by the signal detecting unit 5 (S1). This electrical resistance includes information on the electrical resistance in the contact portion of the carbon thin film 1 with the iron oxide 2 before the electrical bias is applied. This electrical resistance is the initial resistance.

Next, an electrical bias (voltage or current) with the carbon thin film 1 side being positive is applied between the carbon thin film 1 and the iron oxide 2 by the bias applying unit 3 (S2). In the example shown in FIG. 3, an electrical bias in the form of a pulse (electrical pulse) is applied N times. The electrical bias to be applied between the carbon thin film 1 and the iron oxide 2 is not limited to being in the form of a pulse. For example, a direct current bias may be applied for a specific period of time.

The number of times the electrical pulse is applied in S2 can be adjusted on the basis of the intensity and the pulse width of the electrical pulse. The number of times the electrical pulse is applied in S2, and the intensity and the pulse width thereof may be adjusted on the basis of the initial resistance detected in S1. In the case of the second or subsequent repetition of S2 to be performed when "NO" is determined in S4, the number of times the electrical pulse is applied in S2, and the intensity and the pulse width thereof are desirably adjusted on the basis of the information on the electrical resistance in the above-mentioned circuit detected in S3.

Next, the electrical resistance of the above-mentioned circuit is detected by the signal detecting unit 5 as electrical signals including information on the electrical resistance in the contact portion of the carbon thin film 1 with the iron oxide 2 (S3).

Next, whether or not the electrical signals detected by the signal detecting unit 5 represent a specific signal is determined by the determination unit 6 (S4). The basis of the determination is whether or not the electrical resistance of the above-mentioned circuit has reached a specific threshold. That is, the determination unit 6 examines whether or not the detected signals are electrical signals to be obtained when the electrical resistance of the above-mentioned circuit has reached the specific value.

When the signals include the very value of the electrical resistance, the determination unit 6 determines, for example, whether or not the value is a specific electrical resistance. In the case where the signals represent information on changes in the electrical resistance, the determination unit 6 determines, for example, whether or not the amount of changes in the electrical resistance included in the detected signals is not more than the specific threshold. This can be applied to the case where changes in the electrical resistance caused by application of an electrical bias are reduced when the specific electrical resistance is achieved.

The data (specific threshold) that serve as the basis of the determination is stored, for example, in a recording portion of the signal detecting unit 5 and/or a recording portion of the determination unit 6. Such data may be one electrical signal (for example, a single value of the electrical resistance), or may be electrical signals with some range (for example, a range of the electrical resistance). The recording portions can be composed of recording elements such as RAM (Random Access Memory) and ROM (Read Only Memory).

When it is determined that the specific signal has been obtained in S4 (the specific electrical resistance has been achieved) (YES in FIG. 3), the production process is ended in accordance with the flow chart (S5). In the case where it is determined that the specific signal has not been obtained (the specific electrical resistance has not yet been achieved) (NO in FIG. 3), the production process returns to the step S2, and then S2, S3, and S4 are repeated until the determination in S4 gives a result of YES. The production process is ended, for example, by terminating the application of the electrical bias.

That is, in the production method of the present disclosure, the second step may include a first sub-step of applying a voltage or current between the carbon thin film 1 and the iron oxide 2, a second sub-step of detecting electrical signals including information on the electrical resistance in the contact portion of the carbon thin film 1 with the iron oxide 2, and a third sub-step of examining whether or not the detected electrical signals are electrical signals to be obtained when the electrical resistance has reached a specific value. In this case, the first sub-step, the second sub-step, and the third sub-step may be repeated in this order in the second step until the detected electrical signals are determined to be the electrical signals to be obtained when the electrical resistance has reached the specific value.

In another embodiment of the production method of the present disclosure, the conditions for the application of the electrical bias that allow the electrical resistance in the contact portion of the carbon thin film 1 with the iron oxide 2 to exhibit the specific value are set in advance, and then the electrical bias is applied between the carbon thin film 1 and the iron oxide 2 in accordance with such conditions. In this embodiment, an oxidized carbon thin film can be produced using the configuration in FIG. 1 by step S2 and step S5 in FIG. 3.

Figure 4:
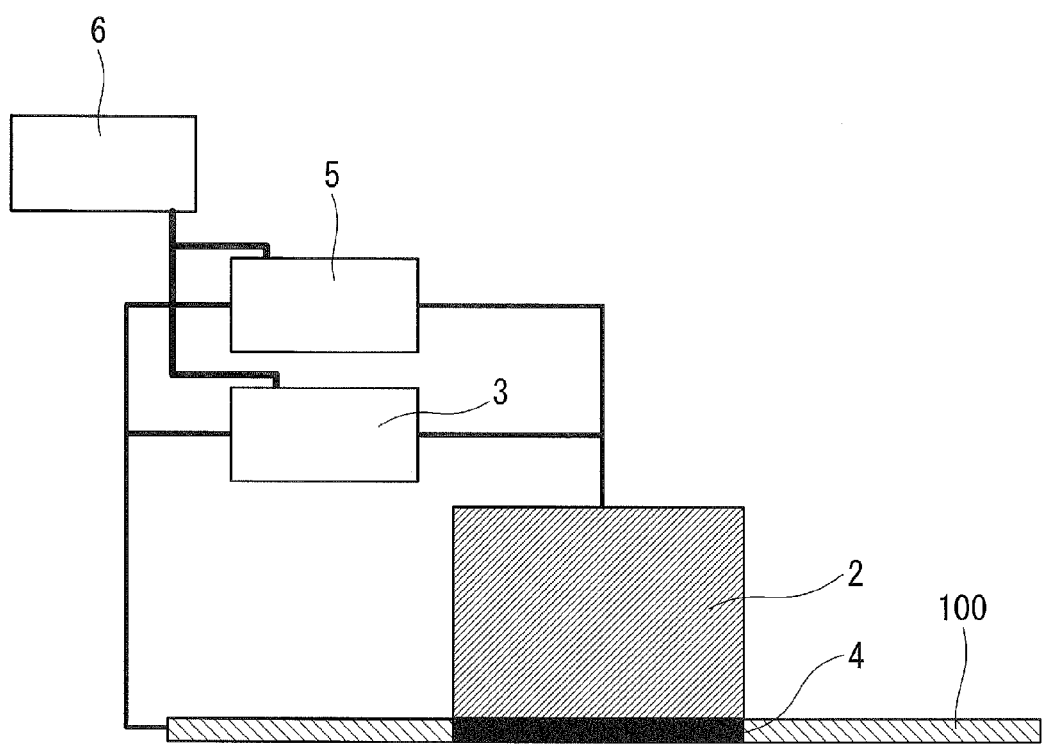
FIG. 4 is a schematic diagram showing an example of an oxidized carbon thin film produced using the configuration shown in FIG. 2 according to the production method for the oxidized carbon thin film of the present disclosure.

FIG. 4 shows an oxidized carbon thin film 100 formed using the configuration shown in FIG. 2 by applying an electrical bias between the carbon thin film 1 and the iron oxide 2. The oxidized carbon thin film 100 shown in FIG. 4 has an oxidized portion 4 composed of oxidized carbon in the contact portion of the thin film with the iron oxide 2. In the case where the carbon thin film 1 used herein is graphene, the oxidized portion 4 is composed of oxidized graphene. The oxidized portion 4 of the example in FIG. 4 occupies all the oxidized portion of the oxidized carbon thin film 100 in the thickness direction.

The oxidized carbon thin film 100 shown in FIG. 4 can be formed by applying an electrical bias between the carbon thin film 1 and the iron oxide 2. The application of the electrical bias, for example, is performed in accordance with the flow chart shown in FIG. 3. The progress of formation of the oxidized portion 4 can be monitored through the above-mentioned information detected by the signal detecting unit 5.

The carbon thin film 1 and the iron oxide 2 in contact with the thin film to be prepared in the first step can be formed by a known thin film forming technique.

An element having an oxidized carbon thin film can be produced by applying the method for producing the oxidized carbon thin film of the present disclosure, which corresponds to the production method for an element of the present disclosure. The element includes a substrate and an oxidized carbon thin film disposed on the substrate. The oxidized carbon thin film has an oxidized portion composed of oxidized carbon. In the element, for example, the oxidized portion patterned in the oxidized carbon thin film functions as an insulating portion, or a portion (unoxidized portion) other than the patterned oxidized portion functions as a conductive portion and/or a semiconductor portion.

In the production method for the element of the present disclosure, a substrate, the carbon thin film 1 disposed on the substrate, and the iron oxide 2 containing $Fe_2O_3$ are prepared so that the iron oxide 2 is in contact with the carbon thin film 1 at a position to form the oxidized portion 4 in the carbon thin film 1 (first step). In order to achieve this, for example, the iron oxide 2 may be deposited on a portion in the carbon thin film 1 where the oxidized portion 4 is formed so as to be in contact with the thin film 1. A known thin film forming technique and thin film fine fabrication technique can be applied to the deposition of the iron oxide 2.

Thereafter, the oxidized carbon thin film 100 having the oxidized portion 4 is formed by applying a voltage or current between the carbon thin film 1 and the iron oxide 2 with the carbon thin film 1 side being positive and thereby oxidizing a contact portion of the carbon thin film 1 with the iron oxide 2 to change it into the oxidized portion 4 (second step). Details of the first and second steps are the same as those of the first and second steps in the production method for the oxidized carbon thin film of the present disclosure.

The substrate is a substrate composed of a conductor or semiconductor. The substrate, for example, is an n-type or p-type doped Si substrate. An insulating layer may be disposed between the substrate and the carbon thin film 1. The insulating layer, for example, is an oxide film such as an $SiO_2$ film (including thermally oxidized Si), an $Al_2O_3$ film, and an $HfO_2$ film, a nitride film, or an organic substance film. Although it also depends on the use of the element, the insulating film is desirably composed of a material which allows an electric field to be applied between the substrate and the formed oxidized carbon thin film.

Figure 5:
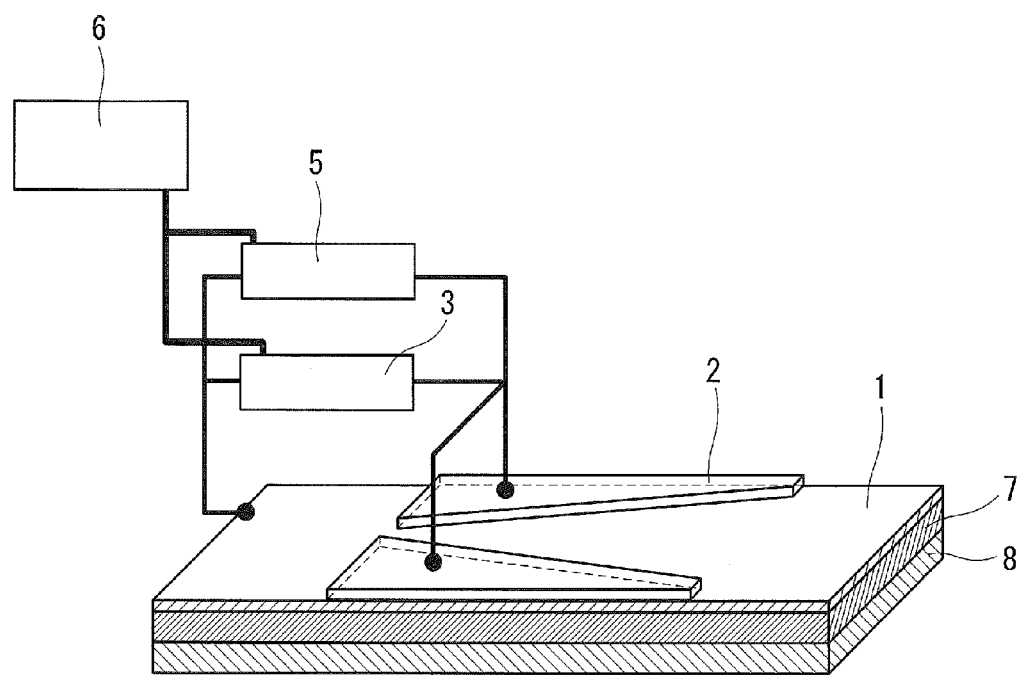
FIG. 5 is a schematic diagram showing an example of a configuration including a carbon thin film and iron oxide which makes the production method for the element of the present disclosure feasible.

The production method for the element of the present disclosure, for example, can be performed using a configuration shown in FIG. 1 or FIG. 2 in accordance with the flow chart shown in FIG. 3. FIG. 5 shows an example of the embodiment using the configuration shown in FIG. 2.

In the example shown in FIG. 5, the carbon thin film 1 is formed on a substrate 8 via an insulating layer 7. The iron oxide 2 containing $Fe_2O_3$ is disposed on the carbon thin film 1 so as to be in contact with the thin film 1. An electrical bias is applied between the carbon thin film 1 and the iron oxide 2 by the bias applying unit 3, which allows an oxidized portion corresponding to the position of the iron oxide 2 to be formed in the carbon thin film 1. Thus, an element including an oxidized carbon thin film that has an oxidized portion is formed. The oxidized portion may be patterned.

Figure 6:
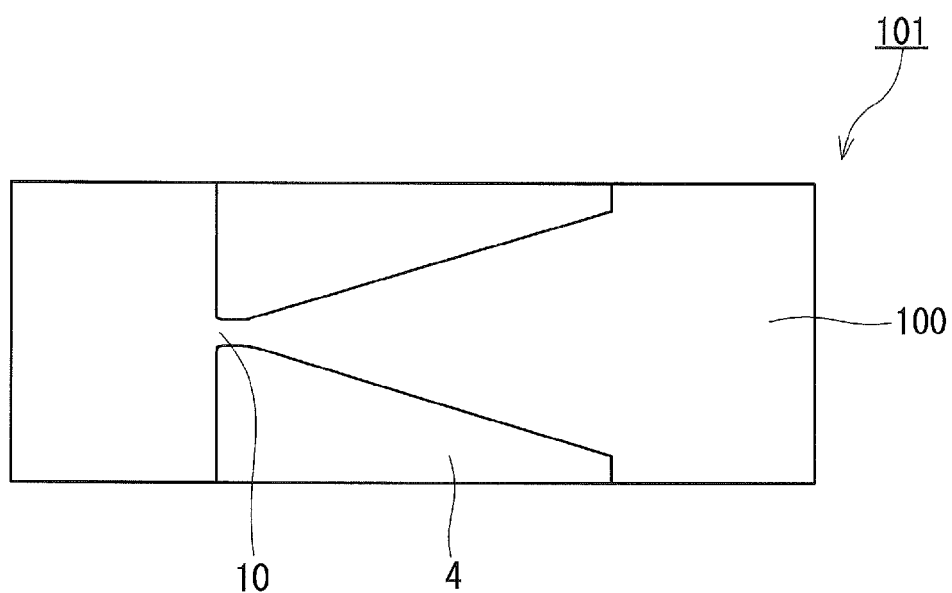
FIG. 6 is a plan view schematically showing an example of an element having the oxidized carbon thin film produced by the production method for the element of the present disclosure.

FIG. 6 shows an element 101 formed in the example shown in FIG. 5. FIG. 6 is a view of the element 101 as seen from the direction perpendicular to the main plane of the oxidized carbon thin film 100. The element 101 includes the oxidized carbon thin film 100 in which the oxidized portion 4 is formed in the shape of the iron oxide 2. In the element 101, the oxidized portion 4 functions as an insulating portion. The oxidized carbon thin film 100 has an non-insulating portion composed of carbon as a portion other than the oxidized portion 4. The non-insulating portion has a narrow portion 10 arranged between a pair of oxidized portions (insulating portions) 4, as seen from the direction perpendicular to the main plane of the oxidized carbon thin film 100. In the case where the carbon thin film 1 used herein is graphene, the narrow portion 10 functions as a semiconductor depending on its minimum width. In order for the narrow portion 10 to function as a semiconductor, the minimum width of the narrow portion 10 is desirably 10 nm or less. In the production method for the element of the present disclosure, such fine patterning is possible on the carbon thin film 1 represented by graphene.

Figure 7:
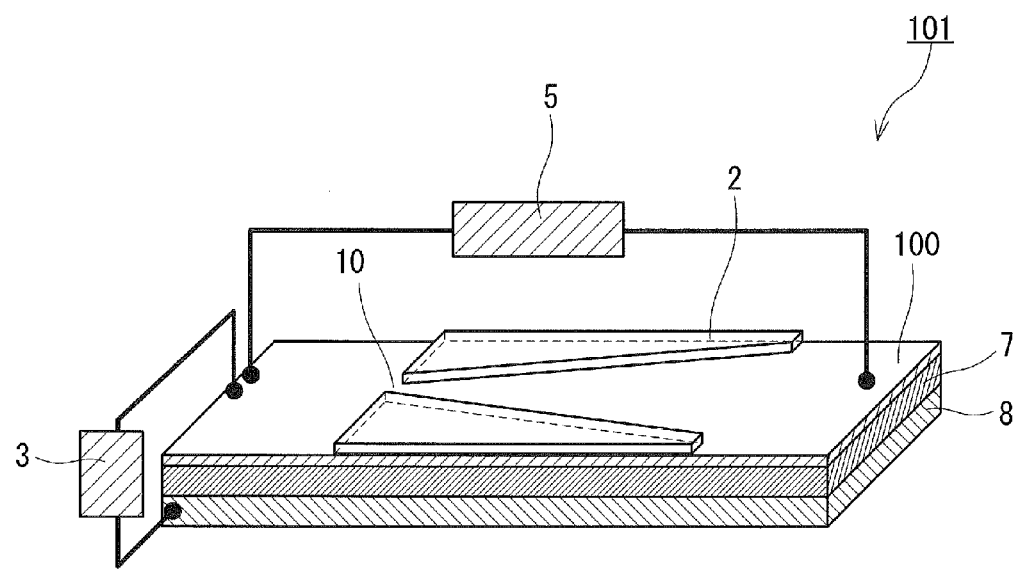
FIG. 7 is a perspective view schematically showing an example of the element having the oxidized carbon thin film produced by the production method for the element of the present disclosure.

FIG. 7 shows an example of the thus formed element of the present disclosure. The element 101 shown in FIG. 7 includes the substrate 8, the oxidized carbon thin film 100 disposed on the substrate 8, and the insulating layer 7 disposed between the substrate 8 and the oxidized carbon thin film 100. The oxidized carbon thin film 100 has the oxidized portion (insulating portion) 4 composed of oxidized carbon and an non-insulating portion composed of carbon. The non-insulating portion has the narrow portion 10 arranged between the insulating portions 4 as seen from the direction perpendicular to the main plane of the oxidized carbon thin film 100. Application of an electric field between the substrate 8 and the oxidized carbon thin film 100 varies the electrical conductivity of the non-insulating portions via the narrow portion 10 in the in-plane direction of the oxidized carbon thin film 100. This element (carbon thin film element) can function as a field-effect element, such as a transistor, in which the value of current flowing through the element depends on an electric field applied to the element.

In the element 101, an electric field is applied between the substrate 8 and the oxidized carbon thin film 100 by the bias applying unit 3. The value of current flowing through the non-insulating portion via the narrow portion 10 is detected by the signal detecting unit 5.

The minimum width of the narrow portion 10 in the element 101 is desirably 10 nm or less, in order for the element 101 to function as a field-effect element.

EXAMPLES

Hereinafter, the present disclosure is described further in detail with reference to the examples.

Example 1

First, multilayer graphene was prepared as the carbon thin film 1 with reference to the description of Science, vol. 306, pp. 666-669 (2004). Specifically, a crystal specimen was exfoliated by attaching a cellophane adhesive tape to 1-mm thick highly oriented pyrolytic graphite (HOPG). A cellophane adhesive tape was further attached to the exfoliated crystal specimen, a part of which was thereby exfoliated to obtain a thinner piece. This operation of attaching a cellophane adhesive tape to a resultant thin piece to exfoliate a part thereof was repeated a plurality of times. Thereafter, a thin piece of HOPG on the adhesive tape was rubbed against a substrate made of MgO. The thickness of the carbon thin film 1 on the MgO substrate, as determined using an atomic force microscope (AFM), was about 1±0.5 nm. This thickness corresponds to the total thickness of several carbon atom layers. It was separately confirmed that the same results could be obtained, even when a substrate composed of a material other than MgO was used, as long as this substrate had a strength to allow the thin piece to be disposed. It was also separately confirmed that it was not necessary to use a substrate when the HOPG had a thickness of about several μm.

Next, the iron oxide 2 was deposited by pulsed laser deposition in an area of 30 μm×30 μm on the surface of the carbon thin film 1. The iron oxide 2 was deposited by forming and disposing a silicon oxide ($SiO_2$) film having an opening with a size of 30 μm×30 μm and a metal mask having an opening with a size of 200 μm×200 μm sequentially in this order on the carbon thin film 1 (where the centers of these openings were made coincident as seen from the direction perpendicular to the main plane of the carbon thin film 1), and then depositing the iron oxide 2 over the $SiO_2$ film and the metal mask.

As a target for deposition of the iron oxide 2, a 20-mm diameter×5-mm thick $Fe_3O_4$ sintered body was used, and an excimer laser (KrF; wavelength: 248 nm) was used as laser. The iron oxide 2 was deposited with a substrate temperature of 100 to 400° C. (typically 200° C.), in an atmosphere adjusted to $10^{-1}$ to $10^{-5}$ Pa with an oxygen gas flow under an ultimate degree of vacuum of $10^{-5}$ to $10^{-6}$ Pa (typically adjusted to $2\times10^{-2}$ Pa with an oxygen gas flow rate of 2 sccm), at a power density of 4 to 10 $J/cm^2$ (typically 6 $J/cm^2$) for irradiation of the target. The unit of the oxygen gas flow rate, sccm, is "standard cc/min", which indicates the gas flow rate per minute under conditions normalized at a pressure of 1 atm and a temperature of 0° C. The iron oxide 2 was deposited to a design thickness, which had been calculated from the film forming rate, of at least 1 nm but not more than 50 nm (typically 5 nm). The shape of the iron oxide 2 thus deposited was the same as that of the opening of the $SiO_2$ film, as seen from the direction perpendicular to the main plane of the carbon thin film 1.

Figure 8:
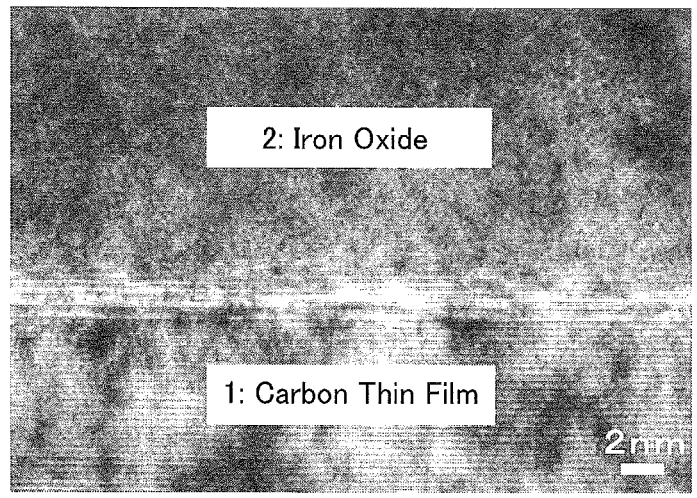
FIG. 8 is a view showing a cross section in the vicinity of the contact interface between a carbon thin film composed of multilayer graphene and an iron oxide thin film formed on the carbon thin film, as evaluated in Example.

An iron oxide thin film (thickness: about 100 nm) was separately formed on another MgO substrate under the same deposition conditions as above. The determination of its structure by X-ray diffraction and Raman spectroscopic analysis demonstrated that the thin film was composed of polycrystal whose main component was $Fe_2O_3$. The specific resistance was about 30 mΩ·cm at room temperature. FIG. 8 shows a cross section (cross sectional image by a transmission electron microscope (TEM)) in the vicinity of the contact interface between a carbon thin film (thickness: about 100 nm) composed of multilayer graphene and an iron oxide thin film separately formed on this carbon thin film under the same deposition conditions as mentioned above. As shown in FIG. 8, the carbon thin film and the iron oxide thin film were in contact at a steep interface.

Next, for the purpose of improving the electrical contact with the bias applying unit 3 and the signal detecting unit 5, $Fe_3O_4$ (thickness: 50 nm) was further deposited on the deposited iron oxide 2 by pulsed laser deposition. As a target for deposition of $Fe_3O_4$, a 20-mm diameter×5-mm thick $Fe_3O_4$ sintered body was used, and an excimer laser (KrF; wavelength: 248 nm) was used as laser. $Fe_3O_4$ was deposited with a substrate temperature of 100 to 400° C. (typically 300° C.), in an atmosphere without oxygen gas flow under an ultimate degree of vacuum of $10^{-5}$ to $10^{-6}$ Pa, at a power density of 4 to 10 $J/cm^2$ (typically 6 $J/cm^2$) for irradiation of the target. The film thickness of $Fe_3O_4$ to be deposited was calculated from the film forming rate. A sample 1-1 produced in Example 1 had a structure in which a 50-nm thick $Fe_3O_4$ film as an electrode was deposited on the iron oxide 2 (whose main component was $Fe_2O_3$) having a design thickness of 5 nm and being deposited under a condition of the oxygen flow rate of 2 sccm.

Next, in order that the electrical resistance in a contact portion of the carbon thin film 1 with the iron oxide 2 was detected as well as an electrical bias was applied to the iron oxide 2 via the deposited $Fe_3O_4$ electrode, the bias applying unit 3 and the signal detecting unit 5 were electrically connected to the carbon thin film 1 and the iron oxide 2. A pulse generator 81110A, manufactured by Agilent Technologies, Inc., was used as the bias applying unit 3. A source meter 2425, manufactured by Keithley Instruments, Inc., was used as the signal detecting unit 5.

Next, an electrical bias was applied to the carbon thin film 1 and the iron oxide 2 in accordance with the flow chart shown in FIG. 3, thereby forming the oxidized portion 4 in the carbon thin film 1. The applied electrical bias was a pulse voltage having a pulse width of 1 μs and a potential difference between the carbon thin film 1 and the iron oxide 2 of 3.5 V (with the carbon thin film 1 side being positive). The electrical resistance in the contact portion of the carbon thin film 1 with the iron oxide 2 was increased after a lapse of time from the application of the electrical bias. This was taken as a change caused in the resistance, and shown as "Occurred" in Table 1 below. In the column of "sample configuration" in the subsequent tables including Table 1, a numeral value within parentheses means film thickness.

TABLE 1

| Sample | Configuration of Sample | Applied Electrical Bias | Resistance Change |
|---|---|---|---|
| 1-1 | Carbon Thin Film 1/ Iron Oxide 2 (5 nm)/$Fe_3O_4$ Electrode (50 nm) | Pulse Voltage (Potential Difference: 3.5 V; Pulse Width: 1 μs) | Occurred |

Figure 9:
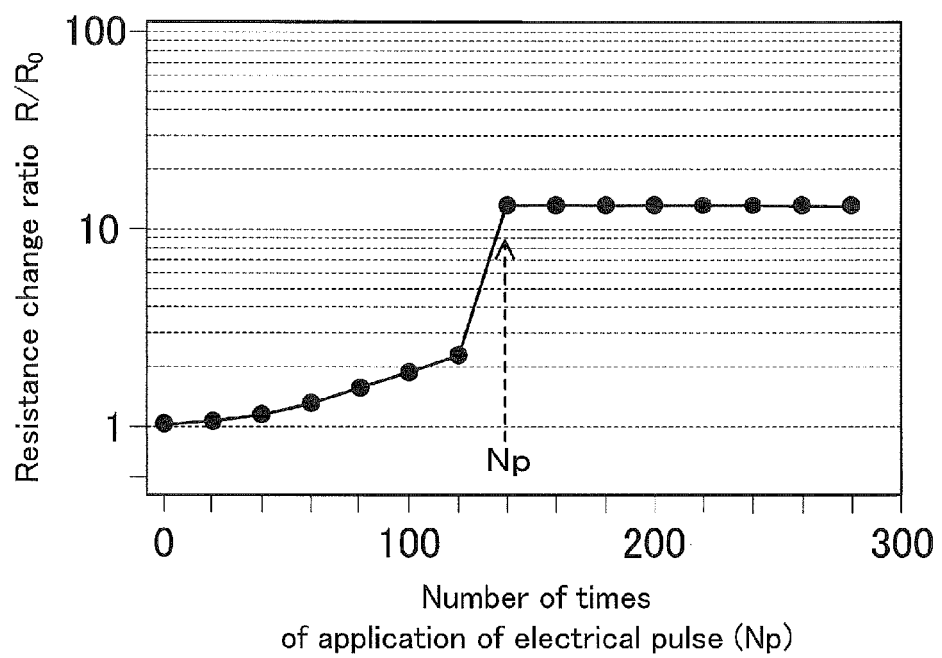
FIG. 9 is a graph showing an example of changes, when an electrical bias in the form of a pulse (electrical pulse) is applied between the carbon thin film and iron oxide in Example, in the electrical resistance relative to the number of times the electrical pulse is applied.
Figure 10:
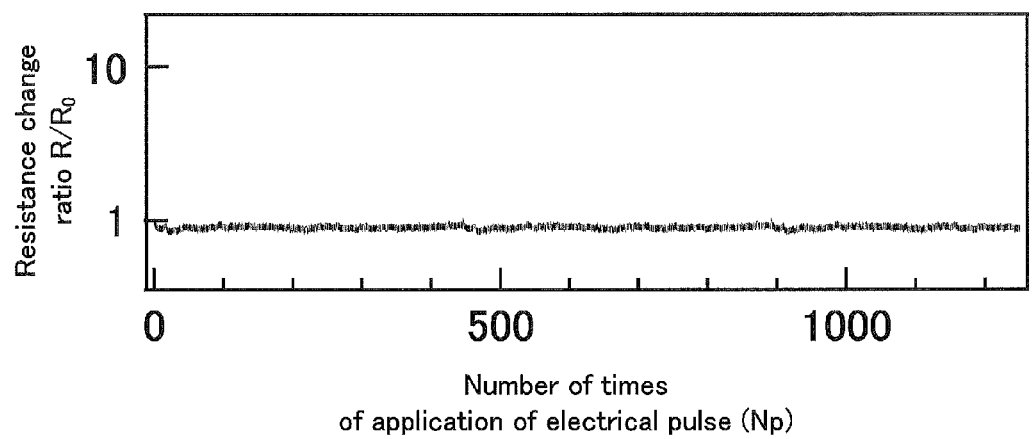
FIG. 10 is a graph showing changes, when an electrical pulse is applied between the carbon thin film and iron oxide in Comparative Example, in the electrical resistance relative to the number of times the electrical pulse is applied.

FIG. 9 shows changes in the electrical resistance of the sample 1-1 caused by the application of the electrical bias. In FIG. 9, the electrical resistance R measured every 20-time application of the electrical pulse is shown as a ratio (resistance change ratio $R/R_0$) with respect to the electrical resistance (initial resistance) $R_0$ before the application of the electrical bias. As shown in FIG. 9, the formation of the oxidized portion (oxidized graphene) by the application of the electrical bias was detected as a mild increase in the resistance change ratio $R/R_0$ accompanying the increase in the number of times the electrical pulse was applied. When the number Np of times the electrical pulse was applied had reached 140 times, the electrical resistance suddenly rose, and thereafter the resistance change ratio $R/R_0$ was maintained at an almost constant value even when an electrical pulse was further applied. This can be understood as a behavior similar to a behavior in which, in a circuit where a constant voltage is applied to a number of parallel resistances and the respective resistances connected in parallel increase sequentially (the resistances turn to a high level), the overall resistances suddenly increase when the last resistance has turned to a high level. On the other hand, in the case where the electrical pulse was applied in the same manner as above except that the electrical pulse was negative on the carbon thin film 1 side, such a change in the resistance (increase of the electrical resistance) as shown in FIG. 9 did not occur even when the electrical pulse was applied 1000 or more times, as shown in FIG. 10.

The change that occurred in the carbon thin film 1 shown in FIG. 9 was also confirmed as an increase of the D-band (about 1350 cm$^{-1}$) peak due to defects, in Raman spectroscopy.

The same results as those obtained in the sample 1-1 were obtained both in the case of varying the design thickness of the iron oxide 2, in the range from 1 nm to 50 nm and in the case of varying the area of the contact portion, where the carbon thin film 1 and the iron oxide 2 are in contact, in the range from 1 μm$^2$ to 2500 μm$^2$.

The results obtained in the sample 1-1 were obtained only when electrons flow from Fe$_2$O$_3$ as the iron oxide 2 to the carbon thin film 1. It is inferred that the oxidized portion 4 in the carbon thin film 1 is formed by the oxygen ions of Fe$_2$O$_3$ moving toward the graphene side thereby causing an oxidation reaction of carbon such as Fe$_2$O$_3$+C→Fe$_3$O$_4$+CO. Two phases of Fe$_3$O$_4$ and Fe$_2$O$_3$ have a relationship that facilitates the reconstruction of Fe ion sites to proceed and the oxygen ions to migrate toward each other, which seems to contribute much to the accomplishment of the inventions disclosed in the present disclosure.

Figure 11:
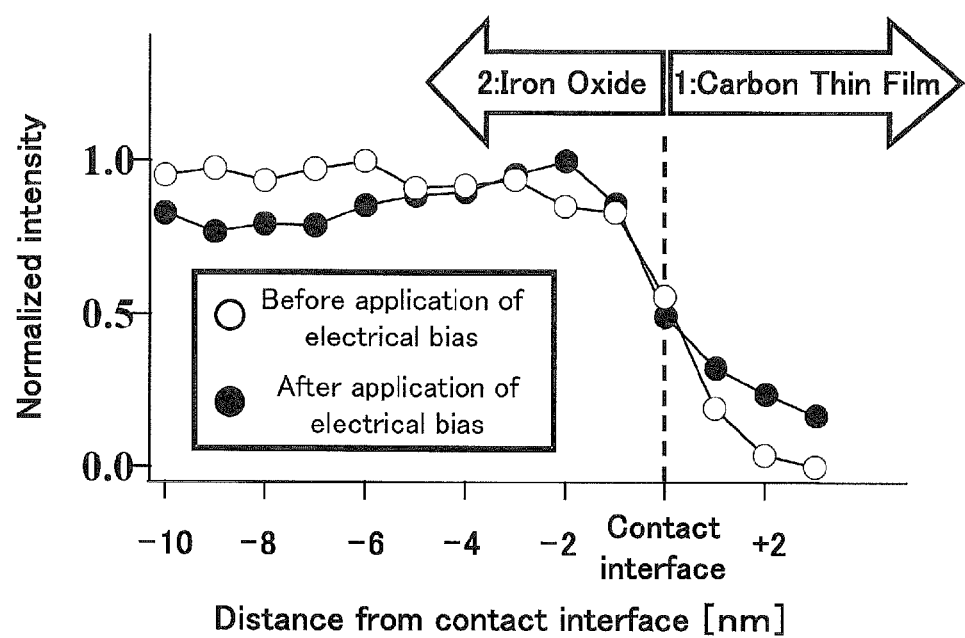
FIG. 11 is a graph showing the distribution of oxygen in the carbon thin film and iron oxide before and after the application of an electrical bias, as evaluated in Example.

In order to confirm this, the changes of the carbon thin film 1 and the iron oxide 2 before and after the application of the electrical bias were evaluated as follows. First, a stack of the MgO substrate, the carbon thin film 1, and the iron oxide 2 was formed in the same manner as mentioned above except that the carbon thin film 1 having a larger thickness than the sample 1-1 (thickness: about 10 nm) was prepared, and the design thickness of the iron oxide 2 was about 25 nm. Next, the oxygen distribution in the vicinity of the contact interface between the carbon thin film 1 and the iron oxide 2 in the formed stack was evaluated by electron energy loss spectroscopy (EELS) with respect to the image of the cross section observed using a transmission electron microscope. FIG. 11 shows the evaluation results as those "before application of electrical bias". Next, the same electrical bias as one applied to the sample 1-1 was applied to the formed stack until the resistance change ratio $R/R_0$ of the stack becomes constant after an increase. The stack showed the same change in the resistance change ratio $R/R_0$ as the sample 1-1 by the application of the electrical bias. Next, the oxygen distribution in the vicinity of the contact interface between the carbon thin film 1 and the iron oxide 2 in the stack after the application of the electrical bias was evaluated in the same manner as mentioned above. FIG. 11 shows the evaluation results as those "after application of electrical bias". The longitudinal axis in FIG. 11 represents the normalized intensity of the peak derived from oxygen, which is observed at about 545 eV in terms of energy loss. As shown in FIG. 11, it was confirmed that oxygen in the iron oxide 2 accumulated around the contact interface with the carbon thin film 1 upon the application of the electrical bias, part of which was diffused toward the carbon thin film 1 side.

One possible reason why the application of the electrical bias with the carbon thin film 1 side being positive causes oxygen to move from the iron oxide 2 to the carbon thin film 1 and promotes the oxidation of the thin film 1 is that the difference of the Gibbs free energy relating to the oxidation of carbon from the Gibbs free energy relating to the oxidation of Fe$_3$O$_4$ into Fe$_2$O$_3$ is negative in a wide temperature range. In the case where the difference in the free energy is negative, the oxidation of carbon is more stable than the oxidation of iron oxide. Ellingham diagrams showing the free energy of various oxides indicate that the oxidation of carbon is stable in a temperature range of 300° C. or more. Actually, the above-mentioned indication of the oxidation of carbon being stable qualitatively match the results of this example in which the oxidation of the carbon thin film 1 proceeds during the application of the electrical bias, because a local high temperature occurs due to the application of the electrical bias to the carbon thin film 1 and the iron oxide 2. That is, it would not be until the finding of a mutually suitable relationship to be established between the carbon thin film 1 and the iron oxide 2 that the results of this example have been brought about.

Comparative Example 1

In Comparative Example 1, the formation of an oxidized carbon thin film was attempted using magnesium oxide (MgO) with a film thickness of 5 nm instead of the iron oxide 2 (sample 1-A). The sample 1-A was produced in the same manner as the sample 1-1 of Example 1 except that MgO was deposited instead of the iron oxide 2. MgO was deposited by pulsed laser deposition, using a 20-mm diameter×2-mm thick MgO sintered body as a target and an excimer laser (KrF; wavelength: 248 nm) as laser. The deposition conditions were set to a substrate temperature from room temperature to 300° C. (typically room temperature), an atmosphere without oxygen gas flow under an ultimate degree of vacuum of 10$^{-5}$ to 10$^{-6}$ Pa, and a power density of 4 to 10 J/cm$^2$ (typically 6 J/cm$^2$) for irradiation of the target. The deposited thickness of the MgO film was calculated from the film forming rate. For the purpose of improving the electrical contact with the bias applying unit 3 and the signal detecting unit 5, Fe$_3$O$_4$ (thickness: 50 nm) was further deposited on the MgO in the same manner as in the sample 1-1 where the iron oxide 2 was deposited. Fe$_3$O$_4$ was deposited under the same conditions as in the sample 1-1.

A voltage pulse having a pulse width of 1 μs and a potential difference between the carbon thin film and MgO of 3.5 V (with the carbon thin film side being positive) was applied to the thus formed stack of the carbon thin film and MgO. Nevertheless the voltage pulse was applied repeatedly, the contact portion of the carbon thin film 1 with the iron oxide 2, however, did not undergo any changes in the electrical resistance. This was taken as no changes caused in the resistance, and shown as "Not occurred" in Table 2 below.

TABLE 2

| Sample | Configuration of Sample | Applied Electrical Bias | Resistance Change |
|---|---|---|---|
| 1-A (C. Ex.) | Carbon Thin Film 1/ MgO (5 nm)/ $Fe_3O_4$ Electrode (50 nm) | Pulse Voltage (Potential Difference: 3.5 V; Pulse Width: 1 μs) | Not occurred |

It is inferred that the results shown in Table 2 were derived from the fact that the oxidation of Mg is more stable than the oxidation of carbon in terms of the Gibbs free energy relating to oxidation. Specifically, this is considered to be because oxygen that is necessary for the oxidation of the carbon thin film cannot be extracted from MgO. Example 1 and Comparative Example 1 have demonstrated an effect of the present disclosure that patterning of an oxidized portion in the carbon thin film 1 can be achieved by application of an electrical bias between the carbon thin film 1 and the iron oxide 2.

Example 2 and Comparative Example 2

The content ratio of $Fe_2O_3$ and $Fe_3O_4$ in the deposited iron oxide 2 varies depending on the oxygen gas flow rate during the deposition of the iron oxide 2. In Example 2, samples were produced by varying the oxygen gas flow rate in the atmosphere for the deposition of the iron oxide, and attempts were made to form an oxidized carbon thin film. The five varieties of samples (samples 2-1 to 2-5) produced as Example 2 and one variety of sample (sample 2-A) produced as Comparative Example 2 were produced in the same manner as the sample 1-1 of Example 1, except that the oxygen gas flow rate in the atmosphere for the deposition of the iron oxide was set to the values shown in Table 3 below, and the area of the contact portion between the carbon thin film and iron oxide deposited on the thin film was set to 10 μm×10 μm. Next, a voltage pulse having a pulse width of 1 μs and a potential difference between the carbon thin film and iron oxide of 3.5 V (with the carbon thin film side being positive) was applied to the thus formed stack of the carbon thin film and iron oxide in an attempt to form an oxidized carbon thin film. Table 3 shows the results.

TABLE 3

| Sample | Configuration of Sample | Oxygen Flow Rate (sccm) | Applied Electrical Bias | Resistance Change |
|---|---|---|---|---|
| 2-1 | Carbon Thin Film 1/ | 10 | Pulse Voltage | Occurred |
| 2-2 | Iron Oxide 2 | 5 | (Potential | Occurred |
| 2-3 | (5 nm)/$Fe_3O_4$ | 3 | Difference: 3.5 V; | Occurred |
| 2-4 | Electrode (50 nm) | 2 | Pulse Width: | Occurred |
| 2-5 |  | 1 | 1 μs) | Occurred |
| 2-A (C. Ex.) |  | 0 |  | Not occurred |

The samples 2-1 to 2-5 showed the same change in the resistance change ratio $R/R_0$ as the sample 1-1 caused by the application of the electrical bias. This was taken as a change caused in the resistance, and shown as "Occurred" in the column of resistance change in Table 3. Meanwhile, nevertheless the voltage pulse was applied repeatedly, the contact portion of the carbon thin film with the iron oxide did not undergo any changes in the electrical resistance and the resistance change ratio $R/R_0$ also did not change, in the sample 2-A. This was taken as no changes caused in the resistance, and shown as "Not occurred" in the column of resistance change in Table 3.

Figure 12:
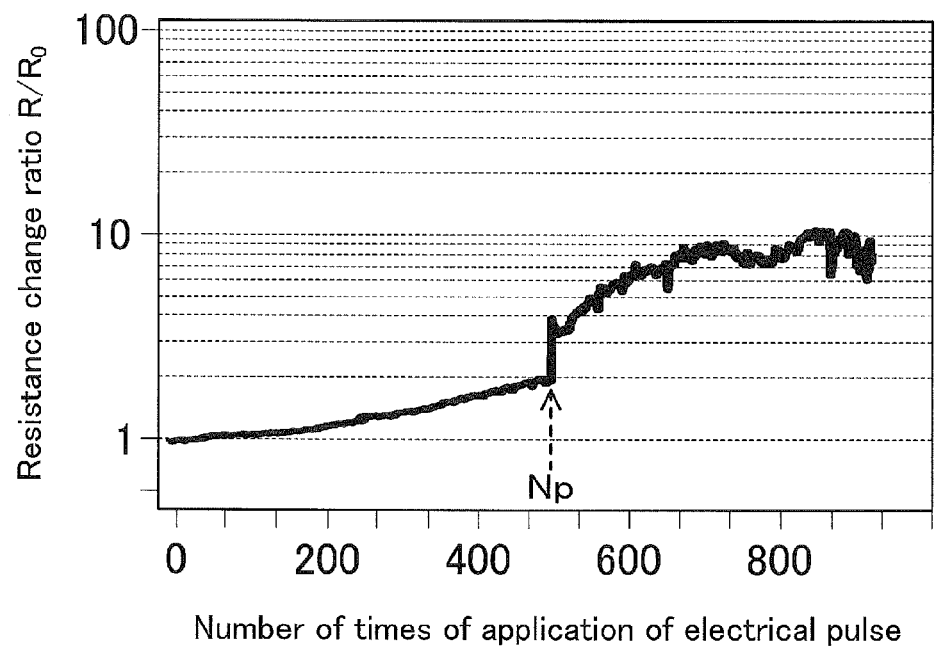
FIG. 12 is a graph showing an example of changes, when an electrical pulse is applied between the carbon thin film and iron oxide in Example, in the electrical resistance relative to the number of times the electrical pulse is applied.

FIG. 12 shows changes in the electrical resistance caused by the application of the electrical bias in the sample 2-5. In FIG. 12, the electrical resistance measured every single time the electrical pulse was applied is shown as the resistance change ratio $R/R_0$ in the same manner as in FIG. 9. As shown in FIG. 12, changes in the electrical resistance that are characteristic for the formation of the oxidized portion such as a mild increase in the resistance change ratio $R/R_0$ accompanying the increase in the number of times the electrical pulse was applied and a sudden increase in the resistance change ratio $R/R_0$ occurring at the time when the number Np of times the electrical pulse was applied had reached 489 times were confirmed in the sample 2-5 where the oxygen gas flow rate in the atmosphere for the deposition of the iron oxide was set to 1 sccm.

Figure 13:
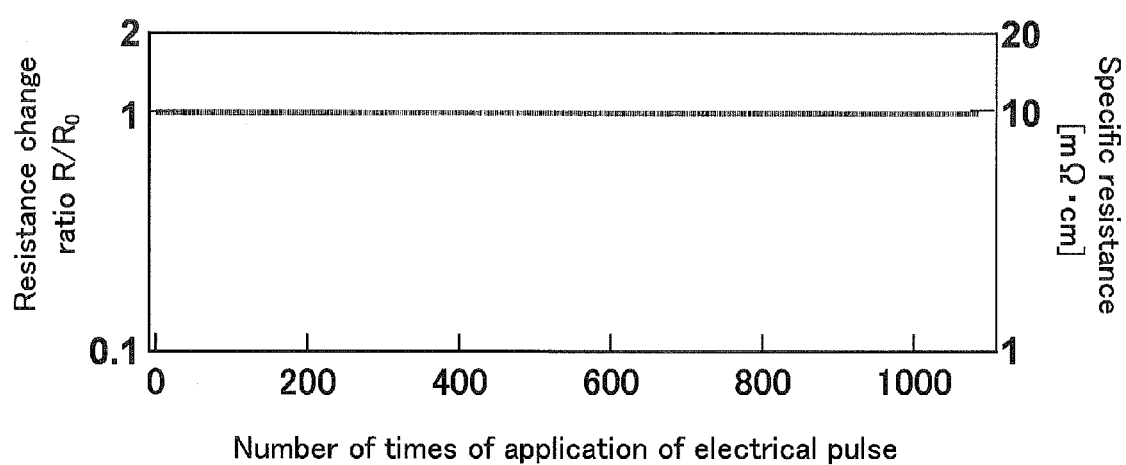
FIG. 13 is a graph showing changes, when an electrical pulse is applied between the carbon thin film and iron oxide in Comparative Example, in the electrical resistance relative to the number of times the electrical pulse is applied.

FIG. 13 shows changes in the electrical resistance caused by the application of the electrical bias in the sample 2-A. As shown in FIG. 13, any changes in the electrical resistance similar to those shown in FIG. 12 (changes in the electrical resistance that are characteristic for the formation of the oxidized portion) did not occur by 1000 or more times of the application of the electrical pulse in the sample 2-A where the oxygen gas flow rate in the atmosphere for the deposition of the iron oxide was set to 0 sccm.

Separately from this, iron oxide was formed into a film with a thickness of 100 nm under the same conditions as those for the deposition of the iron oxide in the sample 2-A. As the temperature dependence of the resistance of the formed iron oxide film was evaluated, electron phase transition, called Verwey transition, that is characteristic for $Fe_3O_4$ was observed at about 130 K (Kelvin). From this, the iron oxide in the sample 2-A was considered to be $Fe_3O_4$. The result for the sample 2-A is probably because oxygen that is necessary for the oxidation of the carbon thin film cannot be extracted from the iron oxide due to the lack of excess oxygen that can move easily in $Fe_3O_4$ with a spinel structure, in addition to the specific resistance of $Fe_3O_4$ as low as about 10 mΩ·cm (see FIG. 13). From the results shown in Table 3, it was found that the iron oxide 2 is required to contain at least $Fe_2O_3$, and is desirably a mixture of $Fe_2O_3$ and $Fe_3O_4$.

Example 3

In Example 3, changes in the resistance change ratio $R/R_0$ in the case of varying the electrical bias to be applied were evaluated using the sample 2-5 produced in Example 2.

When the pulse voltage to be applied was increased from 3.5 V, the number Np of times the electrical pulse was applied, at which the resistance change ratio $R/R_0$ suddenly changes, decreased from 489 times. On the other hand, when the pulse voltage to be applied was decreased from 3.5 V, the number Np increased. When the pulse voltage to be applied was fixed to 3.5 V, the number Np increased by reducing the pulse width from 1 μs, and the number Np decreased by increasing the pulse width from 1 μs. Further, a sudden change in the resistance change ratio $R/R_0$ was observed also in the case where a constant voltage of 3.5 V was applied using a direct current power source, in which the application time of the bias until the sudden change of the resistance change ratio $R/R_0$ also significantly decreased compared to the cumulative time (489 μs) in the case of applying the pulse voltage with a pulse width of 1 μs Np times. These results indicate that the input power of the electrical bias to be applied and Joule heat generated by the application of the electrical bias are related to the formation of the oxidized carbon thin film in the present disclosure. It was also found from Example 3 that the formation of the oxidized carbon thin film can be controlled by controlling the conditions for the application of the electrical bias.

Example 4

In Example 4, an element shown in FIG. 7 was produced using the configuration shown in FIG. 5.

First, the carbon thin film 1 was prepared in the same manner as in Example 1. However, the thin piece of HOPG on the adhesive tape was rubbed against a p-type doped Si substrate so as to be in contact with a thermally oxidized Si film (thickness: 300 nm) formed on the surface of the substrate. The Si substrate corresponds to the substrate 8 in FIGS. 5 and 7, and the thermally oxidized Si film corresponds to the insulating layer 7, respectively.

Next, the iron oxide 2 was deposited on the surface of the carbon thin film 1 to a design thickness of 5 nm by pulsed laser deposition. The specific method and conditions for the deposition of the iron oxide 2 were the same as those for the sample 2-5 (the oxygen gas flow rate was set to 1 sccm in the atmosphere for the deposition). However, the shape of the deposited iron oxide 2 was such that the narrow portion 10 (portion, arranged between a pair of the iron oxides 2, where the carbon thin film 1 is exposed) with a minimum width of 10 nm as seen from the direction perpendicular to the main plane of the carbon thin film was formed as shown in FIGS. 5 to 7. The pair of the iron oxides 2 each had the same wedge shape as seen from that direction. The pair of the iron oxides 2 were deposited so as to be symmetrical to each other in their long side direction. A portion where the carbon thin film 1 was exposed was formed between the pair of the iron oxides 2 on the carbon thin film 1 after the deposition of the iron oxides 2, as seen from the direction perpendicular to the main plane of the carbon thin film 1. The portion is gradually narrower in the long side direction of the iron oxide 2, and finally forms the narrow portion 10. For depositing the iron oxides 2 with such a shape and arrangement, a mask, composed of an inorganic polymer HSQ (Hydrogen Silsesquioxane) that can be used as a resist for electron beam lithography, with an opening coincident with the shape and position of the iron oxides 2 to be deposited was used.

Next, for the purpose of improving the electrical contact with the bias applying unit 3 and the signal detecting unit 5, $Fe_3O_4$ (thickness: 50 nm) was further deposited on the iron oxide 2, in the same manner as in Example 1.

Next, the bias applying unit 3 and the signal detecting unit 5 were electrically connected to the carbon thin film 1 and the iron oxide 2, in order that an electrical bias was applied to the iron oxide 2 via the deposited $Fe_3O_4$ and the electrical resistance in the contact portion of the carbon thin film 1 with the iron oxide 2 was detected. A pulse generator 81110A, manufactured by Agilent Technologies, Inc., was used as the bias applying unit 3. A source meter 2425, manufactured by Keithley Instruments, Inc., was used as the signal detecting unit 5.

Next, an electrical bias was applied to the carbon thin film 1 and the iron oxide 2 in accordance with the flow chart shown in FIG. 3, thereby forming the oxidized portion 4 in the carbon thin film 1. The applied electrical bias was a pulse voltage having a pulse width of 1 μs and a potential difference between the carbon thin film 1 and the iron oxide 2 of 3.5 V (with the carbon thin film side being positive). The electrical resistance in the contact portion of the carbon thin film 1 with the iron oxide 2 increased by the application of the electrical bias. This was taken as a change caused in the resistance, and shown as "Occurred" in Table 4 below.

TABLE 4

| Sample | Configuration of Sample | Applied Electrical Bias | Resistance Change |
|---|---|---|---|
| 4-1 | Carbon Thin Film 1/ Iron Oxide 2 (5 nm)/$Fe_3O_4$ Electrode (50 nm) | Pulse Voltage (Potential Difference: 3.5 V; Pulse Width: 1 μs) | Occurred |

Next, the bias applying unit 3 was electrically connected to the carbon thin film 1 and the Si substrate 8 so that a voltage could be applied between the Si substrate 8 and the carbon thin film 1, and the signal detecting unit 5 was electrically connected to the carbon thin film 1 so that the current flowing in the plane of the carbon thin film 1 via the narrow portion 10 could be detected. Using the Si substrate 8 as a gate electrode, a voltage was applied between the substrate 8 and the carbon thin film 1, and thus changes in the current flowing in the plane of the carbon thin film 1 via the narrow portion 10 were evaluated. As the bias applying unit 3 and the signal detecting unit 5, a semiconductor parameter analyzer 4156C, manufactured by Agilent Technologies, Inc., was used.

As a result of that, when the gate voltage applied between the Si substrate 8 and the carbon thin film 1 was varied from 0 V to 50 V, the current flowing in the plane of the carbon thin film 1 via the narrow portion 10 was modulated at the level of at least one digit. That is, the element produced in Example 4 was a carbon thin film element that functions as a field-effect element.

INDUSTRIAL APPLICABILITY

The production method for the oxidized carbon thin film of the present disclosure can be achieved by applying an electrical bias to a carbon thin film and iron oxide in contact with the carbon thin film to modify the properties of the thin film (to form an oxidized portion in the thin film). This production method has high affinity with a semiconductor process and can be used for a wide range of applications as a basic process technique for producing an electronic device.

The present invention may be embodied in other forms without departing from the spirit or essential characteristics thereof. The embodiments described in this specification are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A production method for an oxidized carbon thin film, comprising:
   a first step of preparing a carbon thin film, and iron oxide that is in contact with the carbon thin film and contains $Fe_2O_3$; and
   a second step of forming an oxidized carbon thin film having an oxidized portion composed of oxidized carbon by
      applying a voltage or current between the carbon thin film and the iron oxide with the carbon thin film side being positive and
      thereby oxidizing a contact portion of the carbon thin film with the iron oxide to change it into the oxidized portion.

2. The production method for the oxidized carbon thin film according to claim 1, wherein the carbon thin film is a single-layer or multilayer graphene.

3. The production method for the oxidized carbon thin film according to claim 1, wherein
a voltage or current in the form of a pulse is applied between the carbon thin film and the iron oxide in the second step.

4. The production method for the oxidized carbon thin film according to claim 1, wherein
the second step comprises a first sub-step of applying the voltage or current between the carbon thin film and the iron oxide, a second sub-step of detecting electrical signals including information on an electrical resistance in a contact portion of the carbon thin film with the iron oxide, and a third sub-step of examining whether or not the detected electrical signals are electrical signals to be obtained when the electrical resistance has reached a specific value.

5. The production method for the oxidized carbon thin film according to claim 4, wherein
the first sub-step, the second sub-step, and the third sub-step are repeated in this order in the second step until the detected electrical signals are determined to be the electrical signals to be obtained when the electrical resistance has reached the specific value.

6. The production method for the oxidized carbon thin film according to claim 1, wherein
the iron oxide further containing $Fe_3O_4$ is prepared in the first step.

7. A production method for an element having an oxidized carbon thin film, the element comprising a substrate and an oxidized carbon thin film that is disposed on the substrate and has an oxidized portion composed of oxidized carbon, the method comprising:
a first step of preparing the substrate, the carbon thin film disposed on the substrate, and iron oxide containing $Fe_2O_3$ such that the iron oxide is in contact with the carbon thin film at a position to form the oxidized portion in the carbon thin film; and
a second step of forming an oxidized carbon thin film having the oxidized portion by
applying a voltage or current between the carbon thin film and the iron oxide with the carbon thin film side being positive and
thereby oxidizing a contact portion of the carbon thin film with the iron oxide to change it into the oxidized portion.

* * * * *